United States Patent [19]

Burns

[11] Patent Number: 5,737,446

[45] Date of Patent: Apr. 7, 1998

[54] METHOD FOR ESTIMATING HIGH FREQUENCY COMPONENTS IN DIGITALLY COMPRESSED IMAGES AND ENCODER AND DECODER FOR CARRYING OUT SAME

[75] Inventor: Ronnie R. Burns, Irvine, Calif.

[73] Assignee: Hughes Electronics, Los Angeles, Calif.

[21] Appl. No.: 709,696

[22] Filed: Sep. 9, 1996

[51] Int. Cl.$^6$ .................................. H04N 1/415
[52] U.S. Cl. .............. 382/232; 382/233; 382/244; 382/248; 382/251; 358/432; 358/433
[58] Field of Search .................. 358/432, 433, 358/426, 261.2, 539; 382/233, 236, 248, 250, 251, 244, 232; 348/403, 404, 405, 409, 420; 395/114

[56] References Cited

U.S. PATENT DOCUMENTS

| | | | |
|---|---|---|---|
| 4,903,317 | 2/1990 | Nishihara et al. | 358/426 |
| 5,109,451 | 4/1992 | Aono | 382/248 |
| 5,327,502 | 7/1994 | Katata et al. | 358/433 |
| 5,416,604 | 5/1995 | Park | 358/433 |
| 5,497,246 | 3/1996 | Abe | 358/432 |

*Primary Examiner*—Edward L. Coles, Sr.
*Assistant Examiner*—Fan Lee
*Attorney, Agent, or Firm*—Terje Gudmestad; Elizabeth E. Leitereg; Wanda Denson-Low

[57] ABSTRACT

A method for estimating high frequency components of a compressed image normally lost during a data compression stage and an encoder and a decoder for carrying out same. The image is compressed to obtain unquantized and quantized frequency domain coefficients. An inverse quantization is performed on the quantized coefficients to obtain lossy frequency domain coefficients. Loss characteristics of the high frequency components are then determined based on the unquantized frequency domain coefficients and the lossy frequency domain coefficients according to one of several methods. Finally, the loss characteristics are coded to obtain encoded loss data corresponding to the lost high frequency components.

14 Claims, 2 Drawing Sheets

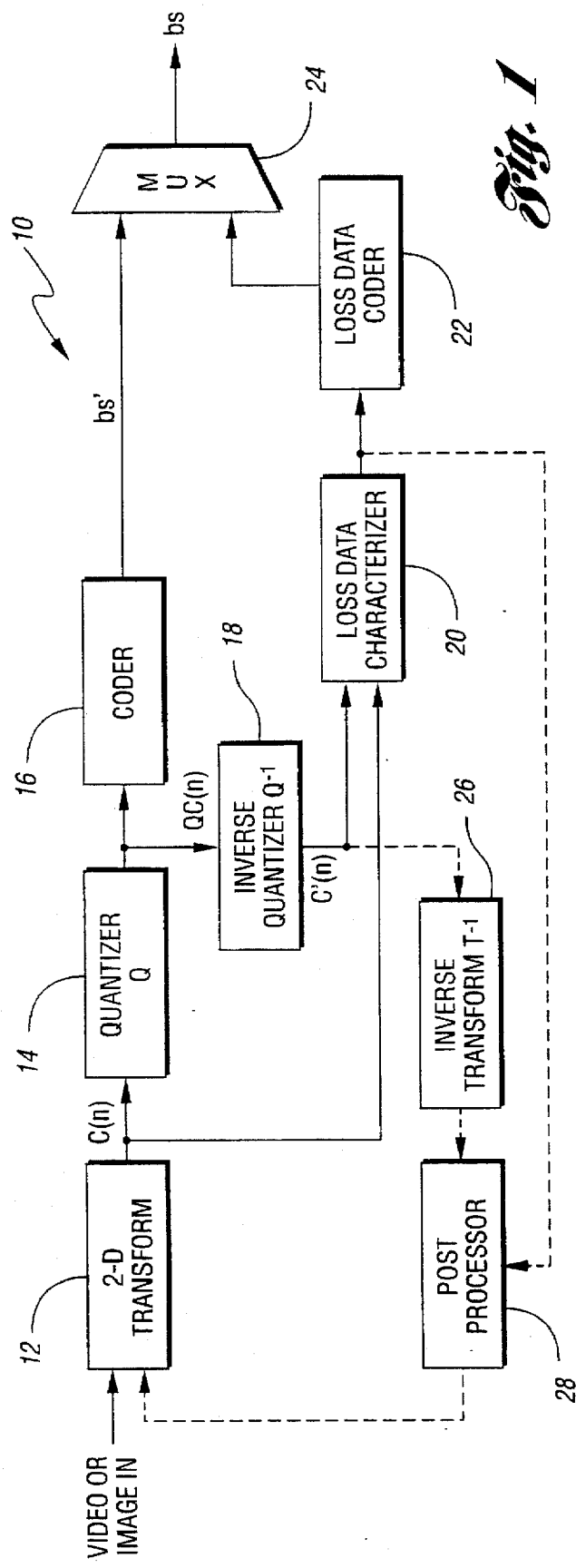
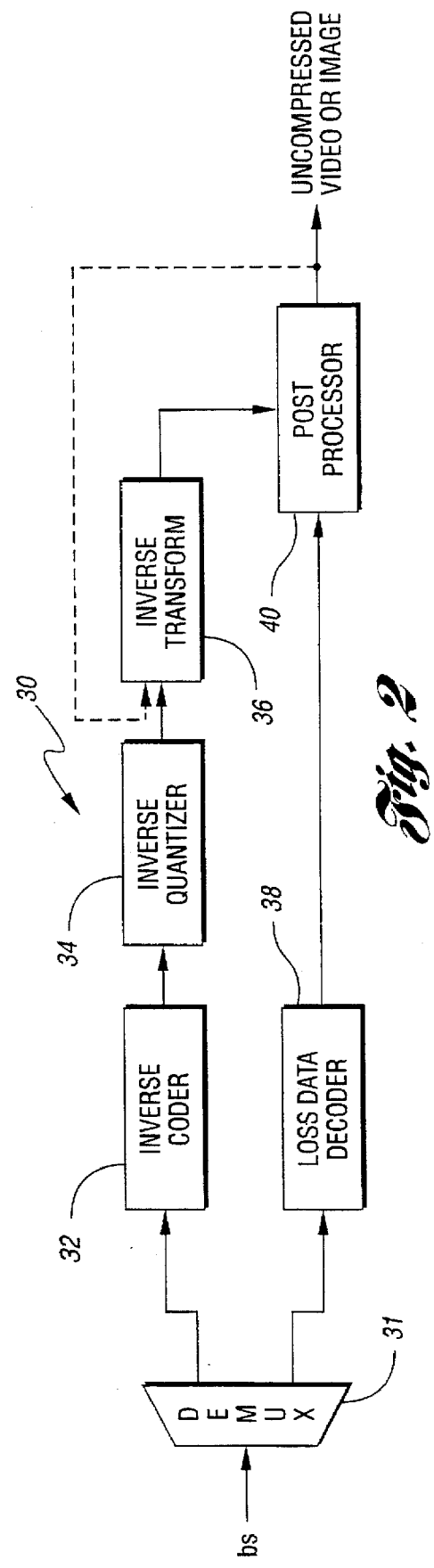

METHOD FOR ESTIMATING HIGH FREQUENCY COMPONENTS IN DIGITALLY COMPRESSED IMAGES AND ENCODER AND DECODER FOR CARRYING OUT SAME

TECHNICAL FIELD

This invention relates to methods for estimating high frequency components of a compressed image normally lost during data compression stage and encoders and decoders for carrying out same.

BACKGROUND ART

Dissemination of information in an efficient and entertaining manner has long been a goal of broadcast media in general, and in particular, composite video information which includes images, text, and associated sound. The television receiver has become a ubiquitous fixture in homes, as well as many offices. New domicile-distribution systems, such as interactive video and video-on-demand, are becoming more popular. Video is also entering the workplace of many corporations and institutions, whether in the form of desk-to-desk videoconferencing, group-based videoconferencing, imaging, video production or development, distance learning and training (locally based and/or remotely based), or other types of video delivery. Compression algorithms are, thus, critical to the viability of digital video, digital video distribution, video on demand, multimedia, and other video services.

Video compression algorithms are employed to reduce the number of bits needed to transmit and store a digital video signal. As a result, a lower bandwidth communication channel can be employed to transmit a compressed video signal in comparison to an uncompressed video signal. Similarly, a reduced capacity of a storage device, which can comprise a memory or a magnetic storage medium, is required for storing the compressed video signal. A general video compression system includes an encoder, which converts the video signal into a compressed signal, and a decoder, which decompresses and reconstructs the video signal based upon the compressed signal.

In general, compression methods or algorithms may be characterized as either lossy or lossless. Lossless methods use an alternative representation of the information which requires less data than the original representation. All of the original information is retained in the alternative representation generated during the compression process and it is therefore "lossless". Lossy compression algorithms generate an alternative representation of the original information which discard some of the information during the compression process to achieve better compression ratios. Since this information is discarded, it can not be regained during decompression and decoding.

Information may also be lost during analog to digital conversion of the image. In converting from a continuous, analog representation of video information to a discrete, digital representation, some of the original information is lost due to quantization error. Similarly, quantization error may result from reducing the number of bits or levels used to represent a particular digital image.

Some level of information loss may be imperceptible to the observer after reconstructing the image due to limitations of human visual acuity and perception, or due to limitations of the viewing equipment. Thus, the strategy for distributing these losses is preferably based on models of the human visual system to make the loss artifacts as unobjectionable as possible. Generally, spatial data with high frequencies are lost during the quantization process.

Current approaches postprocess a decompressed reconstructed image by using various linear or nonlinear filterings that attempt to extrapolate the high frequency components, i.e., sharpening filters. These filters are applied with no a priori information as to how best to make the extrapolation. This may result in an application of the sharpening when not needed resulting in over-sharpening of the image and possibly the introduction of unwanted and objectionable artifacts, such as ringing.

DISCLOSURE OF THE INVENTION

Thus, it is a general object of the present invention to provide a method and system for enhancing high frequency components in digitally compressed images.

It is another object of the present invention to provide a method and an encoder and a decoder for estimating lost data in the form of high frequency components utilizing only a small amount of data that qualitatively identifies the characteristics of the lost high frequency component which is coded and transmitted as part of the compressed image data.

It is yet another object of the present invention to provide a method for improving compression by constructing an enhanced decompressed image at both the encoder and decoder that is closer to the original image to provide better prediction for motion compensation for video images.

In carrying out the above objects and other objects, features, and advantages of the present invention, a method is provided for estimating high frequency components in digitally compressed images. The method includes the step of performing an inverse quantization on quantized coefficients to obtain lossy frequency domain coefficients. The method also includes the step of determining loss characteristics of the high frequency components based on unquantized frequency domain coefficients and the lossy frequency domain coefficients. Finally, the loss characteristics are coded to obtain encoded loss data corresponding to the lost high frequency components.

A method is also provided for performing a decompression on a compressed image to obtain a reconstructed image including high frequency components lost during a data compression stage. The method includes the step of separating the compressed image to obtain coded image coefficients and coded high frequency components. The method also includes the step of performing a decompression on the coded image coefficients to obtain image coefficients. Still further, the method includes the step of inverse coding the coded high frequency components to obtain high frequency components. Finally, the method includes the step of generating a reconstructed image based on the image coefficients and the high frequency components.

In further carrying out the above objects and other objects, features, and advantages of the present invention, an encoder is also provided for carrying out the steps of the above described method. The encoder includes an inverse quantizer for performing an inverse quantization on the quantized coefficients to obtain lossy frequency domain coefficients. The encoder also includes a processor for determining loss characteristics of the high frequency components based on unquantized and lossy frequency domain coefficients. Still further, the encoder includes a coder for coding the loss characteristics to obtain encoded loss data corresponding to the lost high frequency components.

A decoder is also provided for performing a data decompression on a compressed image to obtain a reconstructed image including lost high frequency components. The decoder includes a demultiplexer for separating the compressed image to obtain coded image coefficients and coded high frequency components. The decoder also includes a first inverse coder for performing a decompression on the coded image coefficients to obtain image coefficients. The decoder also includes a second inverse coder for inverse coding the coded high frequency components to obtain high frequency components. Finally, the decoder includes a processor for generating a reconstructed image based on the image coefficients and the high frequency components.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram of an encoder according to the present invention;

FIG. 2 is a block diagram of a decoder according to the present invention; and

BEST MODES FOR CARRYING OUT THE INVENTION

Figure 3:
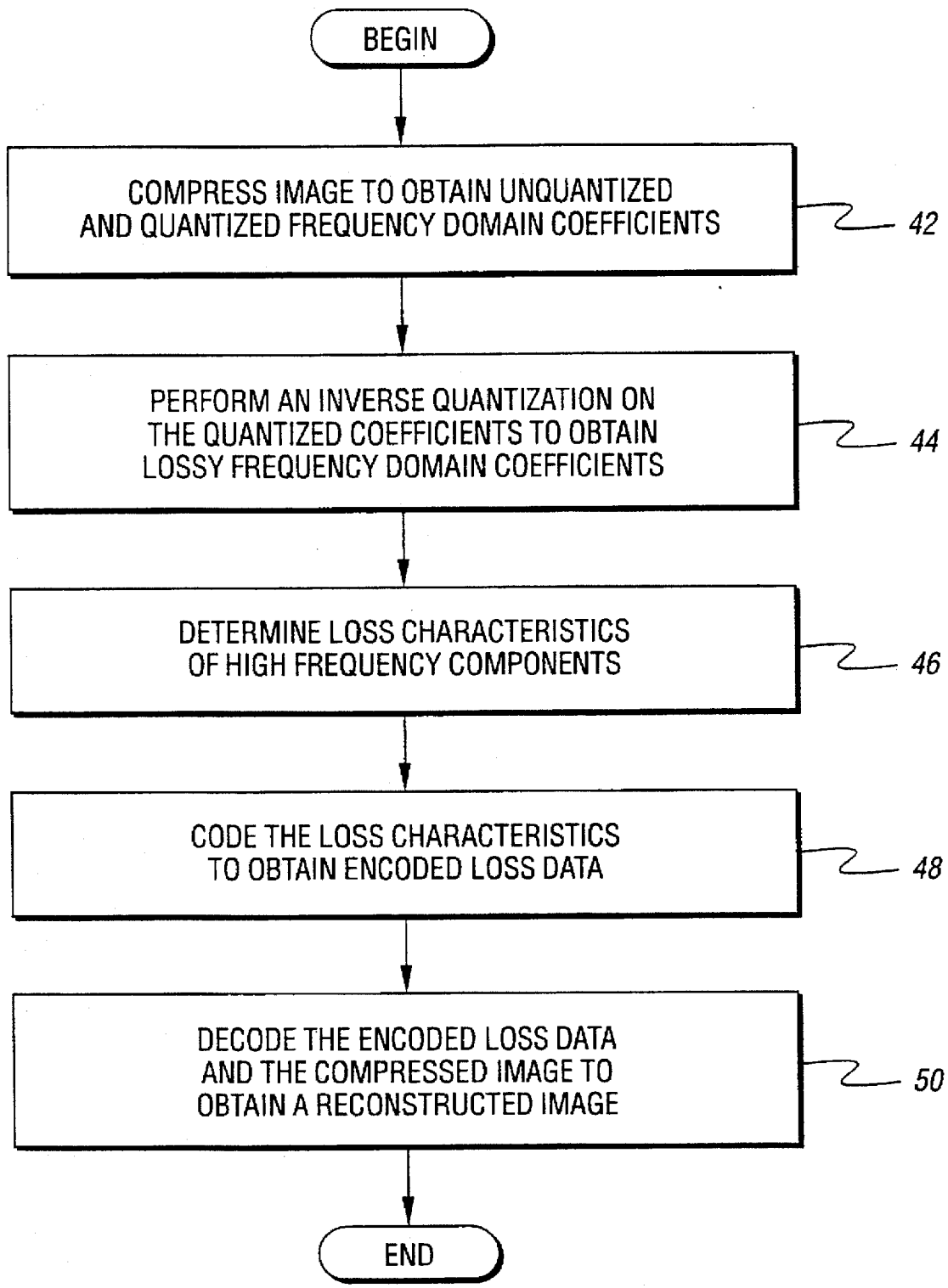
FIG. 3 is a flow diagram illustrating the general sequence of steps associated with the operation of the present invention.

Referring now to FIG. 1, a block diagram of an encoder according to the present invention is shown, denoted generally by reference numeral 10. The encoder 10 includes a 2D transform 12 which receives an input signal representing uncompressed image data, such as video or two-dimensional images. The 2D transform 12 transforms a spatial representation of the uncompressed image data into a frequency domain. The transformation may be made on either an intraframe basis where only the current frame of data is used or on an interframe basis where other frames of data are used to predict the current frame, such as for motion compensation.

A 2D transform is utilized because it provides direct information about the horizontal and vertical frequency or frequency-related properties in the input signal. The 2D transform 12 may be a Discrete Cosine Transform (DCT) which is well known for its efficiency in speech and image compression. DCT-based compression is a compression of a stream of usually 8×8 blocks of gray-scale image samples. Each 8×8 block (represented by 64 point values known as f(x,y), (0≤x≤7, 0≤y ≤7) makes its way through each processing stage, yielding output in compressed form. The 8×8 image blocks capture a range of spatial (horizontal and vertical) frequencies from the lowest to the highest, with 62 intermediate combinations of horizontal and vertical frequency. The 2D DCT decomposes the image into components that are analogous to vertical and horizontal frequency components. Other transforms with similar horizontal and vertical frequency properties are suitable for this invention as well.

The output of the 2D transform 12 are frequency domain coefficients, C(n), such as a set of 64 basis signal amplitudes known as DCT coefficients. These coefficients may be real numbers or functions. The frequency domain coefficients are then quantized utilizing a typical quantizer 14. The purpose of the quantization is to achieve compression by discarding information that is least visually significant.

The quantized coefficients, QC(n), are then transferred to a coder 16 which encodes the quantized coefficients more compactly to achieve lossless compression based on their statistical characteristics, and then formats the quantized coefficients to form a bitstream, bs', which may be stored in an image file. The coder 16 may be an entropy coder such as a Huffman or Ziv-Lempel coder that exploits residual redundancies after quantization.

The 2D transform 12, the quantizer 14, and the coder 16 are typical components of an encoder used in image compression. The encoder 10 of the present invention also includes an inverse quantizer 18 for receiving the quantized coefficients, QC(n), and for approximating the original coefficients, C(n), by recovering lossy frequency domain coefficients. The encoder 10 further includes a loss data characterizer 20 for receiving the unquantized frequency domain coefficients, C(n), from the 2D transform 12 and the lossy frequency domain coefficients, C'(n), from the inverse quantizer 18. The loss data characterizer 20 determines regions of loss due to quantization by comparing the unquantized frequency domain coefficients, C(n), and the lossy frequency domain coefficients, C'(n).

Several different methods may be used to determine regions of loss due to quantization. One such method is a sum of the absolute differences in the coefficients, which is determined according to the following:

$$\sum_{n=1}^{N} |C(n) - C'(n)|. \tag{1}$$

Alternatively, a sum of the square differences in the coefficients may be used which is defined according to the following:

$$\sum_{n=1}^{N} (C(n) - C'(n)) * (C(n) - C'(n)) \tag{2}$$

Sums over subsets of N representing horizontal or vertical frequencies can be made to find, for example, SLL, SHL, SLH, and SHH, where SLL represents the sum of low frequency horizontal and vertical components, SHL represents a sum over high frequency horizontal and low frequency vertical components, SLH represents a sum over low frequency horizontal and high frequency vertical components, and SHH represents a sum over high frequency horizontal and high frequency vertical components. The larger these measures are, the greater the loss. Hence, each of these partial sums of coefficients can then be compared to a threshold or several thresholds to determine if the losses exceed these threshold levels. Alternatively, templates or any other suitable method could be used to ascertain the loss characteristics.

A loss data encoder 22 is coupled to the loss data characterizer 20 which codes the loss data for transmission. Coding of the loss data may be as simple as a two bit code identifying no loss, horizontal frequency loss, vertical frequency loss or both horizontal and vertical losses, e.g., (00), (00), (10) and (11), respectively. The loss information may be on a block by block basis or averaged over several blocks to minimize the number of new bits transmitted. The coded loss data may be transmitted on a separate channel than the bitstream, bs', or included in the bitstream, bs', to form a new bitstream, bs, via a multiplexer 24.

The 2D transform 12, the quantizer 14, the coder 16, the inverse quantizer 18, the loss data characterizer 20, and the loss data encoder 22, are required for encoding a single frame image which would result in an image file rather than a bitstream. In the case of video data, the encoder 10 may include a motion compensation loop. As shown by the dotted lines in FIG. 1, the motion compensation loop consists of an inverse transform 26 coupled to the inverse quantizer 18 for recovering the same lossy images that a typical decoder is able to recover. The motion compensation loop may also include an encoding post processor 28 coupled to the inverse transform 26 which identifies the transform for normal encoding.

Turning now to FIG. 2, there is shown a block diagram of a decoder according to the present invention, denoted generally by reference numeral 30. The decoder 30 includes a demultiplexer 31 for receiving the bitstream, bs, encoded with the loss data information and for separating the data accordingly. The bitstream is sent to an inverse coder 32 which decodes the bitstream.

The decoder 30 also includes an inverse quantizer 34 for performing an inverse quantization. The inverse quantized coefficients are then transferred to an inverse transform 36 which performs an inverse transformation.

The decoder 30 of the present invention further includes a loss data decoder 38 for decoding the loss data information. A decoding post processor 40 is coupled to the inverse transform 36 and the loss data decoder 38 for postprocessing the image recovered. The dotted line shown from the decoding post processor 40 to the inverse transform 36 is a feedback signal for the motion compensation loop if the encoding post processor 28 is used in the encoder 10.

Turning now to FIG. 3, there is shown a flow diagram illustrating the general sequence of steps associated with the operation of the present invention. The method begins with the step of compressing the image to obtain unquantized and quantized frequency domain coefficients, as shown at block 42. Next, an inverse quantization is performed on the quantized coefficients to obtain lossy frequency domain coefficients, as shown at block Loss characteristics of the high frequency components are then determined based on the unquantized and lossy frequency domain coefficients, as shown at block 46. The loss characteristics can be determined according to any one of the methods described above or any other suitable methods. The loss characteristics are then coded to obtain encoded loss data, as shown at block 48.

The encoded loss data may be kept separate from the compressed image or may be multiplexed with the compressed image to obtain a single piece of information. Finally, the encoded loss data and the compressed image are then decoded to obtain a reconstructed image, as shown at block 50.

While the best modes for carrying out the invention have been described in detail, those familiar with the art to which this invention relates will recognize various alternative designs and embodiments for practicing the invention as defined by the following claims.

What is claimed is:

1. A method for performing a data compression on an original image and for estimating high frequency components of the original image lost during a data compression stage, the data compression stage including quantized and unquantized frequency domain coefficients of the high frequency components, the method comprising the steps of:

performing an inverse quantization on the quantized coefficients to obtain lossy frequency domain coefficients;

determining loss characteristics identifying the type of loss associated with the high frequency components based on the unquantized frequency domain coefficients and the lossy frequency domain coefficients; and coding the loss characteristics to obtain coded descriptors.

2. The method as recited in claim 1 wherein the step of determining includes the step of determining an absolute difference between the unquantized frequency domain coefficients and the lossy frequency domain coefficients.

3. The method as recited in claim 1 wherein the step of determining includes the steps of determining a difference between the unquantized frequency domain coefficients and the lossy frequency domain coefficients and performing a square operation on the difference.

4. The method as recited in claim 1 further comprising multiplexing the coded descriptors with the compressed image.

5. The method as recited in claim 1 further comprising the step of decoding the compressed image and the coded descriptors to obtain a reconstructed image.

6. The method as recited in claim 1 further comprising the steps of performing an inverse transformation on the lossy frequency domain coefficients to obtain inverse frequency domain coefficients and determining the unquantized frequency domain coefficients based on the inverse frequency domain coefficients.

7. A method for performing a decompression on a compressed image having coded descriptors identifying the type of loss associated with high frequency components to obtain a reconstructed image, the method comprising the steps of:

separating the compressed image to obtain coded image coefficients and the coded descriptors;

performing a decompression on the coded image coefficients to obtain image coefficients;

inverse coding the coded descriptors; and generating the reconstructed image based on the image coefficients and the inverse coded descriptors.

8. An encoder for performing a data compression on an original image and for estimating high frequency components of the original image lost during a data compression stage, the data compression stage including quantized and unquantized frequency domain coefficients of the high frequency components, the system comprising:

an inverse quantizer for performing an inverse quantization on the quantized coefficients to obtain lossy frequency domain coefficients;

a processor for determining loss characteristics identifying the type of loss associated with the high frequency components based on the unquantized frequency domain coefficients and the lossy frequency domain coefficients; and a coder for coding the loss characteristics to obtain coded descriptors.

9. The encoder as recited in claim 8 wherein the processor determines an absolute difference between the unquantized frequency domain coefficients and the lossy frequency domain coefficients.

10. The encoder as recited in claim 8 wherein the processor determines a difference between the unquantized frequency domain coefficients and the lossy frequency domain coefficients and performs a square operation on the difference.

11. The encoder as recited in claim 8 further comprising a multiplexer for multiplexing the coded descriptors with the compressed image.

12. The encoder as recited in claim 8 further comprising a decoder for decoding the compressed image and the coded descriptors to obtain a reconstructed image.

13. The encoder as recited in claim 8 further comprising an inverse transformer for performing an inverse transformation on the lossy frequency domain coefficients to obtain inverse frequency domain coefficients and a transform encoder for determining the unquantized frequency domain coefficients based on the inverse frequency domain coefficients.

14. A decoder for performing a data decompression on a compressed image to obtain a reconstructed image the compressed image including coded descriptors of the type of loss associated with high frequency components, the system comprising:

a demultiplexer for separating the compressed image to obtain coded image coefficients and the coded descriptors;

a decoder for performing a decompression on the coded image coefficients to obtain image coefficients;

an inverse coder for inverse coding the coded descriptors; and means for generating the reconstructed image based on the image coefficients and the inverse coded descriptors.

* * * * *